(12) United States Patent
Choi et al.

(10) Patent No.: US 8,950,984 B2
(45) Date of Patent: Feb. 10, 2015

(54) EXCHANGEABLE CUTTING INSERT

(75) Inventors: Chang Hee Choi, Daegu (KR); Chang Gyu Park, Daegu (KR); Kang Sool Jung, Daegu (KR)

(73) Assignee: TaeguTec, Ltd., Daegu (KR)

( * ) Notice: Subject to any disclaimer, the term of this patent is extended or adjusted under 35 U.S.C. 154(b) by 1149 days.

(21) Appl. No.: 12/903,701

(22) Filed: Oct. 13, 2010

(65) Prior Publication Data

US 2011/0255924 A1 Oct. 20, 2011

Related U.S. Application Data

(63) Continuation-in-part of application No. PCT/KR2008/002095, filed on Apr. 14, 2008.

(51) Int. Cl.
*B23B 27/22* (2006.01)
*B23B 27/16* (2006.01)
*B23C 5/20* (2006.01)

(52) U.S. Cl.
CPC ........... *B23C 5/202* (2013.01); *B23C 2200/086* (2013.01); *B23C 2200/123* (2013.01); *B23C 2200/201* (2013.01)
USPC .............. 407/114; 407/116; 407/113; 407/42

(58) Field of Classification Search
USPC ........ 407/34, 35, 42, 113–116, 100, 102–104
IPC ................. B23B 27/16,27/22; B23C 5/22, 5/20
See application file for complete search history.

(56) References Cited

U.S. PATENT DOCUMENTS 3,416,209 A * 12/1968 Contrucci et al. ............ 407/101
3,490,117 A * 1/1970 Hertel ........................... 407/104
(Continued)

FOREIGN PATENT DOCUMENTS

EP        0574376 A1    12/1993
JP        08 039329 A    2/1996
(Continued)

OTHER PUBLICATIONS

Official ation dated Aug. 21, 2012 issued in Japanese counterpart application (No. 2011-504908).
(Continued)

*Primary Examiner* — Andrea Wellington
*Assistant Examiner* — Sara Addisu
(74) *Attorney, Agent, or Firm* — Womble Carlyle

(57) ABSTRACT

A cutting insert having a plurality of corner cutting edges has an upper face, a lower face, two longitudinal side faces and two transversal side faces connecting the upper face and the lower face. A through hole passes through central parts of the upper face and the lower face. The longitudinal side faces are opposite to each other and normal to both upper and lower faces, as are the transversal side faces. The upper face and the lower face are each provided with two chip discharge grooves, each chip discharge groove extending along a corresponding one of the transversal side faces, the two chip discharge grooves being inclined oppositely in the transverse direction so that the upper face and the lower face are each provided with two corner cutting edges at diagonally opposite corners. The longitudinal length of the insert is longer than the transversal length of the insert. The cutting insert can be mounted stably to a small-diametered cutter with a sufficient mounting surface.

20 Claims, 4 Drawing Sheets

(56) References Cited

U.S. PATENT DOCUMENTS

| | | | | |
|---|---|---|---|---|
| 3,781,956 | A * | 1/1974 | Jones et al. | 407/113 |
| 3,792,515 | A * | 2/1974 | Lundgren | 407/116 |
| 3,800,379 | A * | 4/1974 | Hopkins | 407/113 |
| 4,050,127 | A * | 9/1977 | Bodem et al. | 407/107 |
| 4,074,949 | A * | 2/1978 | Hochmuth et al. | 407/114 |
| 4,124,326 | A * | 11/1978 | Cost | 407/114 |
| 4,312,250 | A * | 1/1982 | Yankoff | 82/1.11 |
| 4,648,760 | A * | 3/1987 | Karlsson et al. | 408/223 |
| 5,232,319 | A | 8/1993 | Satran et al. | |
| 5,333,972 | A * | 8/1994 | Bernadic et al. | 407/113 |
| 5,441,370 | A * | 8/1995 | Pantzar et al. | 407/113 |
| 5,477,754 | A * | 12/1995 | Herbon | 76/101.1 |
| 5,513,931 | A * | 5/1996 | Reiterman et al. | 407/113 |
| 5,622,461 | A * | 4/1997 | Tukala et al. | 408/224 |
| 5,709,509 | A * | 1/1998 | Wegener et al. | 407/114 |
| 5,758,994 | A * | 6/1998 | Hintze et al. | 407/116 |
| 6,074,137 | A * | 6/2000 | Betman et al. | 407/103 |
| 6,196,770 | B1 * | 3/2001 | Astrom et al. | 407/40 |
| 6,238,146 | B1 * | 5/2001 | Satran et al. | 407/113 |
| 6,527,486 | B2 * | 3/2003 | Wiman et al. | 408/188 |
| 6,599,061 | B1 * | 7/2003 | Nelson | 407/114 |
| 6,742,969 | B1 | 6/2004 | Hoefler | |
| 6,872,034 | B2 * | 3/2005 | Satran et al. | 407/113 |
| 6,921,233 | B2 * | 7/2005 | Duerr et al. | 407/34 |
| 6,932,545 | B2 * | 8/2005 | Vanberg | 407/114 |
| 7,073,987 | B2 * | 7/2006 | Hecht | 407/113 |
| 7,147,407 | B2 | 12/2006 | Satran | |
| 7,150,215 | B2 * | 12/2006 | Krehel | 83/839 |
| 7,278,805 | B2 * | 10/2007 | Ley | 407/114 |
| 7,367,755 | B2 * | 5/2008 | Wurfels et al. | 407/113 |
| 8,696,263 | B2 * | 4/2014 | Saji | 407/113 |
| 2003/0215294 | A1 * | 11/2003 | Wermeister et al. | 407/113 |
| 2005/0214080 | A1 | 9/2005 | Satran | |
| 2007/0071560 | A1 | 3/2007 | Karonen | |
| 2008/0170916 | A1 * | 7/2008 | Ballas et al. | 407/42 |
| 2013/0108387 | A1 * | 5/2013 | Ishi et al. | 409/132 |

FOREIGN PATENT DOCUMENTS

| | | |
|---|---|---|
| JP | 1995-135415 | 12/1996 |
| JP | 1996-135415 | 12/1996 |
| JP | 2005-118965 | 5/2005 |
| KR | 10-2006-0135211 | 12/2006 |
| KR | 10-0718306 | 5/2007 |

OTHER PUBLICATIONS

International Search Report in PCT/KR2008/002095, dated Jan. 14, 2009.
Written Opinion in PCT/KR2008/002095, dated Jan. 14, 2009.
Official Action dated Jun. 8, 2012 issued in Chinese counterpart application (No. 200880129359.1) *with translation*.
Official Action dated Mar. 12, 2013 issued in Japanese counterpart application (No. 2011-504908).
Supplementary Search Report dated Apr. 12, 2013 issued in European counterpart application (No. 08741340.7).

* cited by examiner

EXCHANGEABLE CUTTING INSERT

RELATED APPLICATIONS

This is a continuation-in-part of international application no. PCT/KR2008/002095, filed 14 Apr. 2008, which published as WO 2009/1285681. The contents of the aforementioned application is incorporated by reference in its entirety.

FIELD OF THE INVENTION

The present invention relates to a cutting insert, more particularly, to a small-sized cutting insert having a plurality of corner cutting edges and a sufficient clamping surface formed thereon.

BACKGROUND

As a cutting process for a workpiece is performed by means of a cutting tool to which cutting inserts are mounted, a corner cutting edge of the cutting insert is worn away. For example, in a process of cutting the workpiece by a milling machine, a corner cutting edge of the cutting insert mounted to a cutter is worn away, and so the cutting insert having a worn corner cutting edge can not cut precisely the workpiece.

Thus, the user needs to replace periodically the cutting insert having a worn corner cutting edge with new one. However, it is not economically preferable to remove an expensive cutting insert having one worn corner cutting edge and mount new cutting insert to the cutter.

To extend the service life time of the cutting insert, a cutting insert on which a plurality of corner cutting edges are formed are in need. However, it is extremely difficult to form a plurality of corner cutting edges on a small-sized cutting insert to be mounted to a small-sized cutter, for example, a small-sized cutter having a diameter ($\phi$) of 16 to 40 mm.

In addition, it is difficult to form a clamping hole with a large diameter on the small-sized cutting insert and to form sufficient mounting surface on the small-sized cutting insert for stable mounting the cutting insert a pocket of the cutter.

SUMMARY OF THE INVENTION

To achieve the above object, the cutting insert according to the present invention has a shape having an upper face and a lower face being opposite to each other, and two longitudinal side faces and two transversal side faces connecting the upper face and the lower face, with a through hole passing through each central part of the upper face and the lower face.

Here, the longitudinal side faces are opposite to each other and normal to the upper face and the lower face, and the transversal side faces are opposite to each other and normal to the upper face and the lower face.

In addition, each of the upper face and the lower face is provided with two chip discharge grooves extended along both transversal side faces, and the two chip discharge grooves are inclined oppositely in the transverse direction so that each of the upper face and the lower face is provided with two corner cutting edges at diagonally opposite corners.

Here, the longitudinal length of the cutting insert defined by the maximum length between the transversal side faces is longer than the transversal length defined by the maximum length between the longitudinal side faces.

The longitudinal side faces are preferred to be substantially parallel flat faces, and the transversal side faces are preferred to be convex-curved faces.

In particular, the upper face and the lower face are preferred to be substantially rotationally symmetric with respect to the longitudinal axis traversing the through hole and the transversal axis traversing the through hole. Also, each of the upper face and the lower face is preferred to be substantially 180-degree rotationally symmetric with respect to the axis of the through hole.

In the cutting insert according to the present invention as described above, a length of longitudinal side faces corresponding to the axial direction of a cutter to which the cutting insert is mounted is larger than that of transversal side faces corresponding to the radial direction of the cutter so that the cutting insert with a sufficient mounting surface can be stably mounted even to a small-sized cutter.

In addition, four (4) corner portions of eight (8) corner portions formed on the upper face and the lower face act as the corner cutting edge, and so the service life time of the cutting insert can be significantly extended.

Due to the rotational symmetry of the cutting insert, although the cutting insert 100 is mounted to the pocket after the cutting insert detached from the pocket of the cutter is rotated by 180 degrees in any direction, the cutting insert can be mounted precisely in the pocket.

DETAILED DESCRIPTION

Hereinafter, an embodiment of a cutting insert according to the present invention is described in detail with reference with the accompanying drawings. As one example of the cutting insert, a cutting insert for a milling utilized in a milling process will be illustrated.

Figure 1:
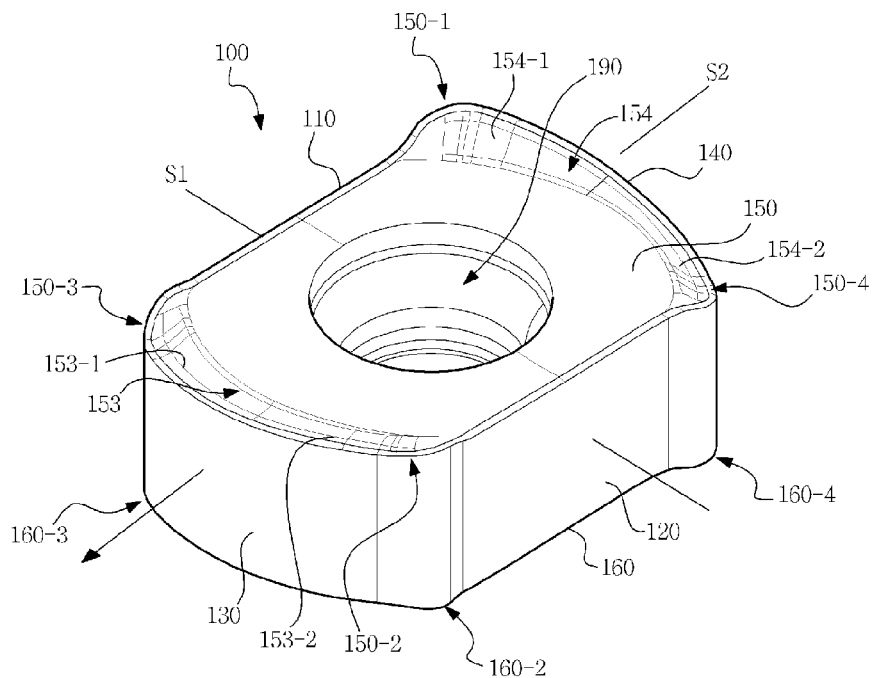
FIG. 1 is a perspective view of a cutting insert according to the present invention.
Figure 2:
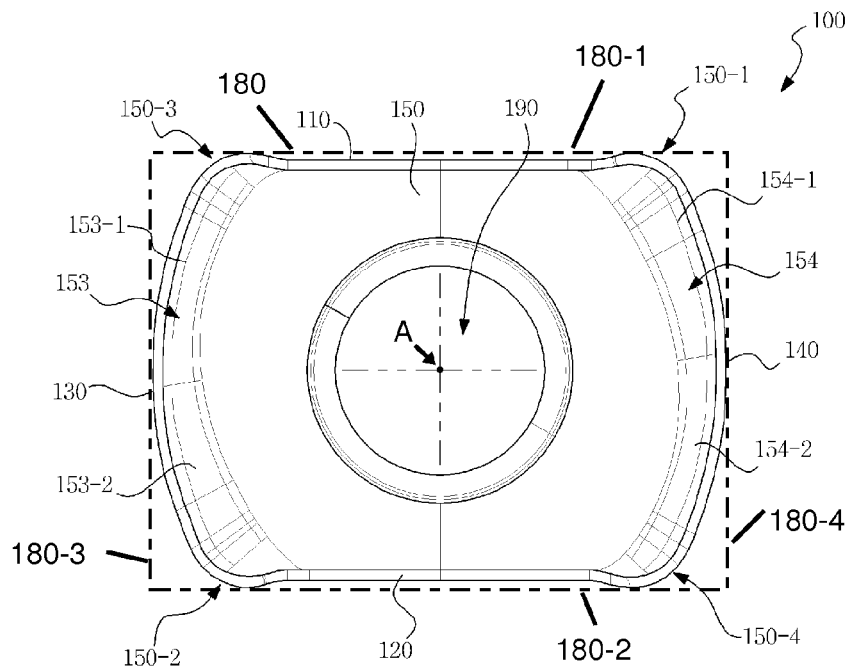
FIG. 2, FIG. 3 and FIG. 4 are plane view, front view and side view of the cutting insert shown in FIG. 1.
Figure 3:
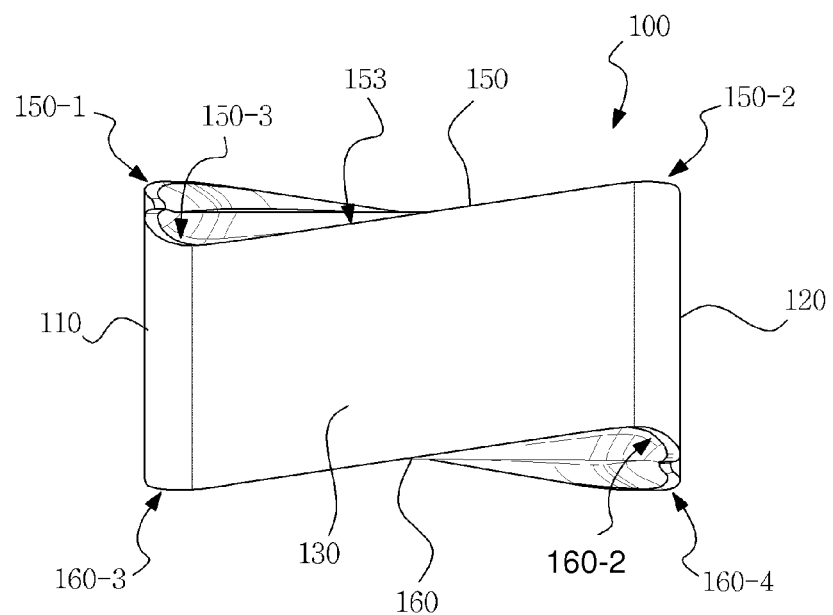
Figure 4:
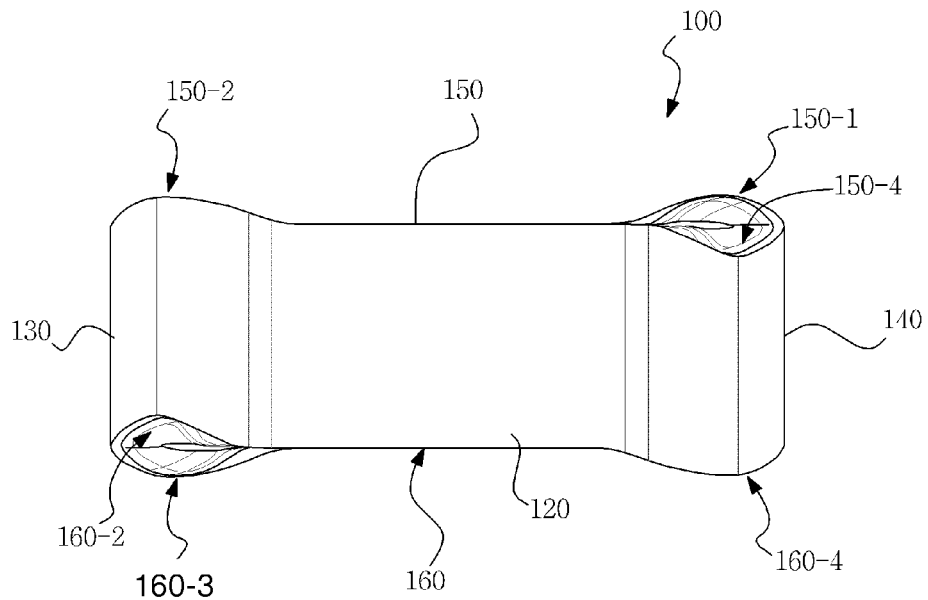

FIG. 1 is a perspective view of a cutting insert according to an embodiment of the present invention, FIG. 2, FIG. 3 and FIG. 4 are plane view, front view and side view of the cutting insert shown in FIG. 1.

A cutting insert 100 according to the present invention has an upper face 150 and a lower face 160 being opposite to each other, four (4) side faces 110, 120, 130 and 140 connecting the upper face 150 and the lower face 160

Here, a through hole 190 passes through each central part of the upper face 150 and the lower face 160 and acts as a clamping hole when the cutting insert 100 is mounted to a cutter (not shown).

The upper face 150 and the lower face 160 are flat faces placed on a pocket (not shown in FIG. 1 to FIG. 4) of a cutter and are substantially parallel with each other.

Four side faces of the cutting insert 100 are normal to the upper face 105 and the lower face 106, and paired into two longitudinal major side faces 110 and 120 being opposite to each other and two transversal minor side faces 130 and 140 being opposite to each other.

Here, the longitudinal length defined by the maximum length between the transversal side faces 130, 140 is longer than the transversal length defined by the maximum length between the longitudinal side faces 110, 120. Referring to FIG. 1, the longitudinal length is the length of an insert along the longitudinal axis S2 traversing the center of the through hole 190 and centers of the two transversal side faces 130 and 140, while the transversal length is the length of the insert along the transversal axis S1 traversing the center of the through hole 190 and centers of the two longitudinal side faces 110 and 120.

As shown in FIG. 1 and FIG. 2, the first side face 110 and the second side face 120 are substantially flat surfaces, and the second side face 130 and the fourth side face 140 are curved (convex) surfaces. Respective border regions (corner portions) of the side faces 110, 120, 130 and 140 form curved faces with a certain curvature.

As seen in the top view of FIG. 2, the insert 100 resides within an imaginary minimum bounding rectangle 180 having two parallel long sides 180-1, 180-2 which are perpendicular to two parallel short sides 180-3, 180-4. As seen in this view, at the transversal axis S1, the insert's longitudinal major side faces 110 and 120 are recessed relative to opposite long sides of the minimum bounding rectangle 180, while at the longitudinal axis S2, the insert's transversal minor side faces 130, 140 are tangential to the opposite short sides of the minimum bounding rectangle 180. In some embodiments, at least 50% of the length of the longitudinal major side faces 110 and 120 is recessed relative to the corresponding long sides of the imaginary minimum bounding rectangle 180.

As shown in FIG. 1 to FIG. 4, the upper face 150 is provided with two chip discharge grooves 153, 154 extended along both transversal side faces 130, 140. Here, the two chip discharge grooves 153, 154 are inclined oppositely in the transverse direction so that the upper face 150 is provided with two corner cutting edges 150-1, 150-2 at diagonally opposite corners, and with two chip exit portions 150-3, 150-4 at the other two diagonally opposite corners.

More particularly, the chip discharge groove 153 of the upper face 150 adjacent to one transverse side face 130 is composed of a downward inclined chip discharge groove 153-1 toward one longitudinal side face 110 and an upward inclined discharge groove 153-2 toward the other longitudinal side face 120 with respect to the longitudinal axis S2.

In addition, the chip discharge groove 154 of the upper face 150 adjacent to the other transverse side face 140 is composed of a downward inclined chip discharge groove 154-2 toward one longitudinal side face 120 and an upward inclined discharge groove 154-1 toward the other longitudinal side face 110 with respect to the longitudinal axis S2.

Accordingly, in the four corner portions 150-1, 150-2, 150-3 and 150-4 of the upper face 150 of the cutting insert 100, two corner portions 150-1 and 150-2 located on one diagonal line are protrude from the upper face 150 and the other two corner portions 150-3 and 150-4 located on the other diagonal line are recessed from the upper face 150.

Here, the two corner portions 150-1 and 150-2 which protrude from the upper face 150 act as the corner cutting edges.

In the meantime, the cutting insert 100 according to the present invention is rotationally symmetric with respect to the transversal axis S1, the longitudinal axis S2 and a vertical axis A of the through hole 190, with axes S1, S2 and A being mutually perpendicular to one another.

In other words, when the cutting insert 100 is rotated by 180 degrees with respect to the transversal axis S1 shown in FIG. 1, although the upper face 150 and the lower face 160 are exchanged each other and two transversal side faces 130 and 140 are exchanged each other, the cutting insert 100 stays in a shape identical to that before rotation.

In addition, when the cutting insert 100 is rotated by 180 degrees with respect to the longitudinal axis S2 which passes through the center of the through hole 190 and centers of two transversal side faces 130 and 140, although the upper face 150 and the lower face 160 are exchanged each other and two longitudinal side faces 110 and 120 are exchanged each other, the cutting insert 100 stays in a shape identical to that before rotation.

In particular, when the cutting insert 100 is rotated by 180 degrees on the vertical axis A of the through hole 190, although two longitudinal side faces 110 and 120 are exchanged each other and two transversal side faces 130 and 140 are exchanged each other, the cutting insert 100 stays in a shape identical to that before rotation.

This rotational symmetry allows indexing of the cutting insert 100. That is, although the cutting insert 100 is mounted to the pocket after the cutting insert 100 detached from the pocket of the cutter is rotated by 180 degrees in any direction, the cutting insert 100 is mountable in the pocket.

According to the cutting insert 100 configured as described above, in four corner portions 150-1, 150-2, 150-3 and 150-4 of the upper face 150, two corner portions 150-1 and 150-2 protrude above the average level of the upper face 150 and act as corner cutting edges, and the other two corner portions 150-3 and 150-4 are recessed from the average level of the upper face 150 and serve as chip exit portions.

As described above, the lower face 160 has a structure which is rotationally symmetric relative to the structure of the upper face 150, and so a detailed description on a structure of the lower face 160 is omitted. It is understood, however, that the lower face 160 similarly has two corner portions 160-3, 160-4 which protrude above the average level of the lower face 160 and act as corner cutting edges, and two other corner portions (only one other corner portion 160-2 being visible in FIGS. 3 and 4) which are recessed from the average level of the lower face 160 and act as chip exits.

Thus, the cutting insert 100 according to the present invention has four (4) corner cutting edges 150-1, 150-2 and 160-3, 160-4.

Figure 5:
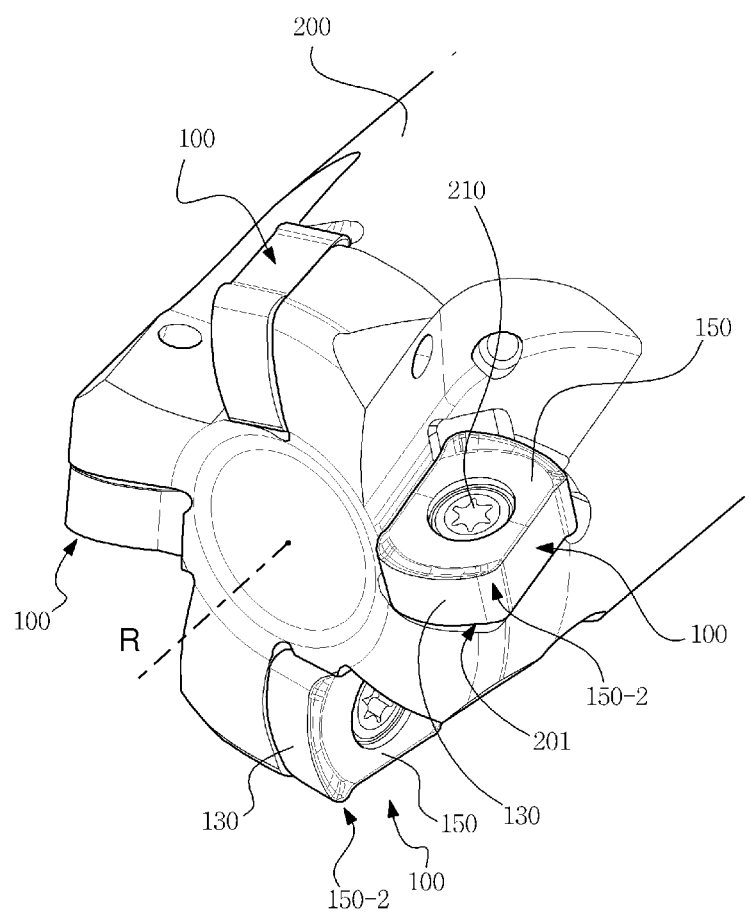
FIG. 5 is a partial perspective view of a cutting tool to which the cutting insert shown in FIG. 1 to FIG. 4 is mounted.
Figure 6:
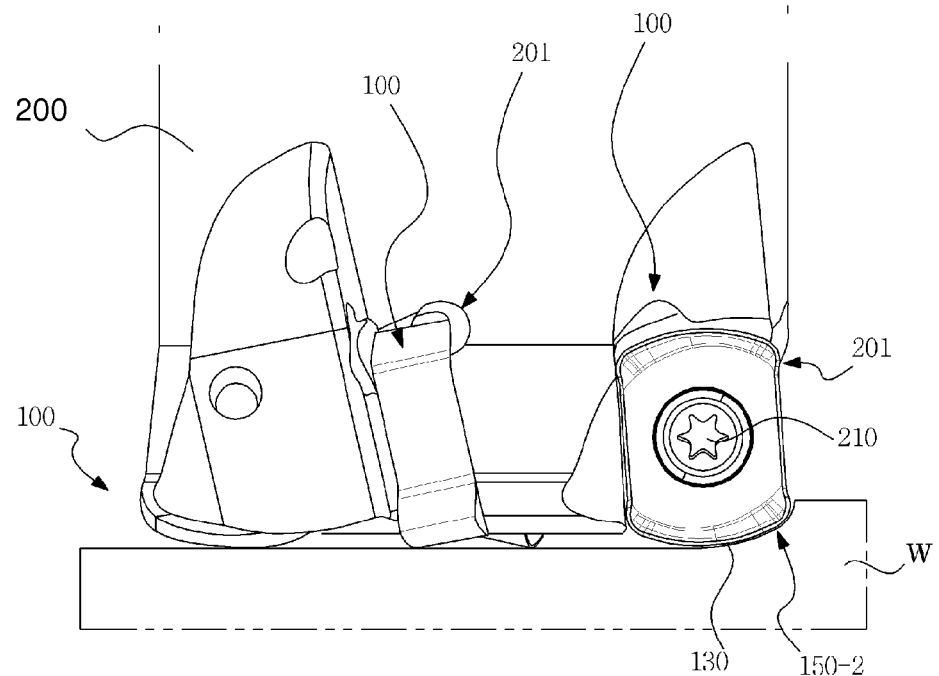
FIG. 6 is a side view of FIG. 5 and shows a relation between the cutting insert and a workpiece.

FIG. 5 is a partial perspective view of a cutting tool to which the cutting insert shown in FIG. 1 to FIG. 4 is mounted, and FIG. 6 is a side view of FIG. 5 and shows a relation between the cutting insert and a workpiece.

For example, the cutting insert 100 is mounted to a pocket 201 formed on a cutter 200 of a milling machine by means of a clamping screw 210, the cutter having a rotary axis R. Here, the lower face 160 is placed on a bottom face of the pocket 201, and one transversal side face (130 in FIG. 6) contacts with a workpiece W. In the state shown in FIG. 5 and FIG. 6, the corner portion 150-2 disposed among the upper face 150, one longitudinal side face 120 and one transversal side face 130 acts as the corner cutting edge.

As shown in FIG. 5 and FIG. 6 in the meantime, two longitudinal side faces 110 and 120 of the cutting insert 100 mounted in the pocket 201 of the cutter 200 are disposed in the axial direction of the cutter 200, and two transversal side faces 130 and 140 are disposed in the radial direction of the cutter 200.

Since the length of the longitudinal side faces 110 and 120 of the cutting insert 100 is larger than the length (width) of the transversal side faces 130 and 140, although the cutting insert is mounted to the small-diametered cutter, a sufficient seating surface can be secured between the cutting insert 100 and the pocket 210 of the cutter.

In the cutting insert 100 according to the present invention, in addition, any one transversal side face 130 (or 140), which is convex curved, becomes in contact with the workpiece W, and so a contact surface between the curved transversal side face 130 the workpiece W is minimized. Accordingly, a cutting resistance exerted to the cutting insert 100 can be minimized.

As described above, as a cutting process for the workpiece W is performed, the corner cutting edge (for example, 150-2) is worn away, so that the worn corner cutting edge 150-2 needs to be replaced with new one. To replace the corner cutting edge, the user separates first the clamping screw 210 from the cutter 100, and then rotates the cutting insert 100 by 180 degrees with respect to the transversal axis S1 or the longitudinal axis S2, or rotates horizontally the cutting insert on the vertical axis of the through hole 190. Finally, the user secures the cutting insert 100 into the pocket 210 of the cutter 200 by the clamping screw 210.

In this state, one of the new corner cutting edges 150-1, 160-3 and 160-4 corresponds to the workpiece W.

Figure 7:
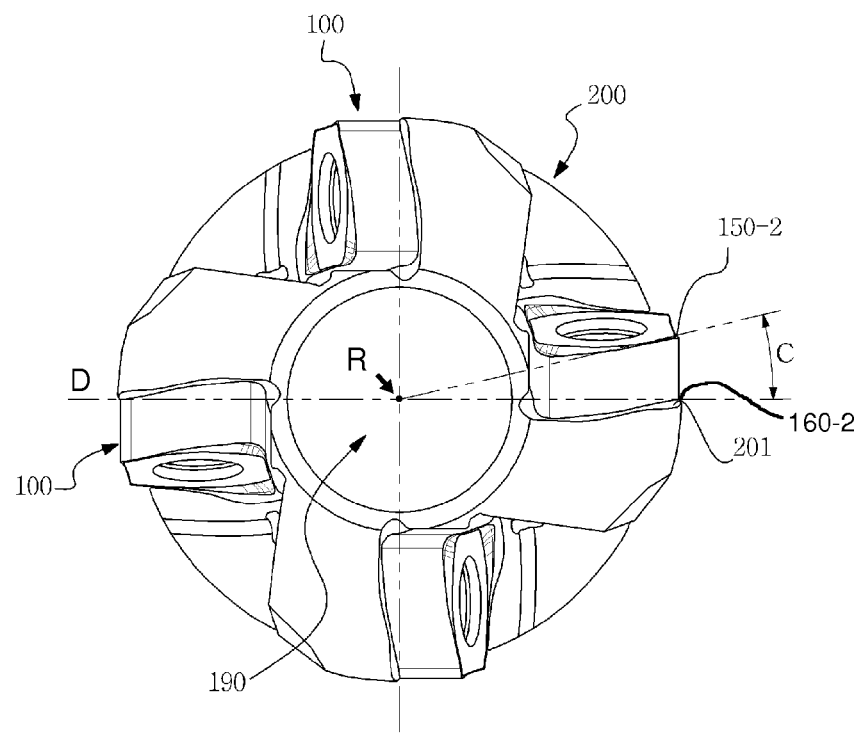
FIG. 7 is a front view of FIG. 5 and shows the cutting insert mounted in a pocket of the cutter.

FIG. 7 is a front view of FIG. 5 and shows the milling cutter 200 having the rotary axis R and a cutting insert 100 mounted in each pocket 201 of the milling cutter.

As seen in the front view of FIG. 7, the milling cutter 200 has a diametric line D which contains the rotary axis R and passes through a cutting insert's radially outer corner portion 160-2 which is recessed from the lower face 160 and directly below the operative corner cutting edge 150-2 that protrudes from the upper face 150. The diametric line D of the cutter 200 and an inclined operative cutting edge (i.e., a cutting blade portion to be contacted with the workpiece W) formed at the intersection of the transversal side surface and the upper face 150, form an angle C therebetween. In one embodiment, the angle C is approximately 13°, such as 13°±2°. In this structure, a chip generated by the corner cutting edge 150-2 is easily discharged and a cutting load can be significantly reduced.

Although the preferred embodiment has been described with reference to the preferred embodiment thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

What is claimed is:

1. A cutting insert (100) comprising:
   an upper face (150) and a lower face (160) which face in opposite directions;
   two longitudinal side faces (110, 120) and two transversal side faces (130, 140) connecting the upper face (150) and the lower face (160);
   a through hole (190) passing through central parts of the upper face (150) and the lower face (160), wherein:
   the longitudinal side faces (110, 120) are opposite to each other, and normal to the upper face (150) and the lower face (160);
   the transversal side faces (130, 140) are opposite to each other, and normal to the upper face (150) and the lower face (160);
   the upper face (150) and the lower face (160) are each provided with two chip discharge grooves (153, 154), each chip discharge groove extending along a corresponding one of the transversal side faces (130, 140), the two chip discharge grooves (153, 154) being inclined oppositely in the transverse direction so that the upper face (150) and the lower face (160) are each provided with two corner cutting edges (150-1, 150-2) at diagonally opposite corners;
   each chip discharge groove (153, 154) begins proximate an associated corner cutting edge (150-1, 150-2, 160-3, 160-4) which protrudes from an associated upper or lower face, extends along a corresponding transversal side face (130, 140), and terminates at a chip exit portion (150-4, 150-3, 160-2) provided at an adjacent corner which is recessed from said associated upper or lower face, and
   a longitudinal length of the insert is longer than a transversal length of the insert.

2. The cutting insert according to claim 1, wherein the longitudinal side faces (110) and (120) are substantially parallel flat faces, and the transversal side faces (130) and (140) are convex-curved faces.

3. The cutting insert according to claim 2, wherein the upper face (150) and the lower face (150) are substantially rotationally symmetric with respect to a longitudinal axis (S2) which passes through the transversal side faces.

4. The cutting insert according to claim 2, wherein the upper face (150) and the lower face (160) are substantially rotationally symmetric with respect to a transversal axis (S1) which passes through the longitudinal side faces.

5. The cutting insert according to claim 2, wherein the upper face (150) and the lower face (160) are each substantially 180-degree rotationally symmetric with respect to a vertical axis (A) of the through hole (190).

6. The cutting insert according to claim 1, wherein the upper face (150) and the lower face (150) are substantially rotationally symmetric with respect to a longitudinal axis (S2) which passes through the transversal side faces.

7. The cutting insert according to claim 1, wherein the upper face (150) and the lower face (160) are substantially rotationally symmetric with respect to a transversal axis (S1) which passes through the longitudinal side faces.

8. The cutting insert according to claim 1, wherein the upper face (150) and the lower face (160) are each substantially 180-degree rotationally symmetric with respect to a vertical axis (A) of the through hole (190).

9. The cutting insert according to claim 1, wherein:
   the upper face (150) and the lower face (150) are substantially rotationally symmetric with respect to a longitudinal axis (S2) which passes through the transversal side faces;
   the upper face (150) and the lower face (160) are substantially rotationally symmetric with respect to a transversal axis (S1) which passes through the longitudinal side faces; and
   the upper face (150) and the lower face (160) are each substantially 180-degree rotationally symmetric with respect to a vertical axis (A) of the through hole (190).

10. The cutting insert according to claim 1, wherein:
    the longitudinal side faces (110) (120) are substantially parallel flat faces;
    the transversal side faces (130) (140) are convex-curved faces;
    in a top view of the cutting insert, the cutting insert resides within an imaginary minimum bounding rectangle (180) having two parallel long sides which are perpendicular to two parallel short sides;
    at a transversal axis (S1) which passes through the longitudinal side faces, the insert's substantially parallel, flat longitudinal side faces (110) (120) are recessed relative to opposite long sides of the minimum bounding rectangle (180);

at a longitudinal axis (S2) which passes through the transverse side faces, the insert's convex-curved transversal side faces (130, 140) are tangential to the opposite short sides of the minimum bounding rectangle (180).

11. The cutting insert according to claim 10, wherein:
at least 50% of the length of the substantially parallel, flat longitudinal side faces (110, 120) is recessed relative to the corresponding long sides of the imaginary minimum bounding rectangle (180).

12. The cutting insert according to claim 1, wherein:
the upper face (150) and the lower face (150) are substantially rotationally symmetric with respect to the longitudinal axis (S2);
the upper face (150) and the lower face (160) are substantially rotationally symmetric with respect to the transversal axis (S1); and
the upper face (150) and the lower face (160) are each substantially 180-degree rotationally symmetric with respect to a vertical axis (A) of the through hole (190).

13. A milling cutter (200) having a rotary axis (R) and comprising:
a plurality of insert pockets (201); and
a cutting insert (100) in accordance with claim 1 seated in each of said plurality of insert pockets.

14. The milling cutter (200) according to claim 13, wherein:
a diametric line (D) of the milling cutter contains the milling cutter's rotary axis (R) and passes through a given cutting insert's radially outer corner portion (160-2) which is recessed from the lower face and directly below the operative corner cutting edge (150-2) that protrudes from the upper face;
the diametric line (D) and an inclined operative cutting edge formed at the intersection of the transversal side surface and the upper face of said given cutting insert form an angle (C) therebetween; wherein:
the angle (C) is approximately 13°±2°.

15. A cutting insert (100) comprising:
an upper face (150) and a lower face (160) which face in opposite directions;
two longitudinal side faces (110, 120) and two transversal side faces (130, 140) connecting the upper face (150) and the lower face (160);
a through hole (190) passing through central parts of the upper face (150) and the lower face (160), wherein:
the longitudinal side faces (110, 120) are opposite to each other, and normal to the upper face (150) and the lower face (160);
the transversal side faces (130, 140) are opposite to each other, and normal to the upper face (150) and the lower face (160);
the upper face (150) and the lower face (160) are each provided with two chip discharge grooves (153, 154), each chip discharge groove extending along a corresponding one of the transversal side faces (130, 140), the two chip discharge grooves (153, 154) being inclined oppositely in the transverse direction so that the upper face (150) and the lower face (160) are each provided with two corner cutting edges (150-1, 150-2) at diagonally opposite corners;
a longitudinal length of the insert is longer than a transversal length of the insert;

the longitudinal side faces (110) (120) are substantially parallel flat faces;
the transversal side faces (130) (140) are convex-curved faces;
in a top view of the cutting insert, the cutting insert resides within an imaginary minimum bounding rectangle (180) having two parallel long sides which are perpendicular to two parallel short sides;
at a transversal axis (S1) which passes through the longitudinal side faces, the insert's substantially parallel, flat longitudinal side faces (110) and (120) are recessed relative to opposite long sides of the minimum bounding rectangle (180);
at a longitudinal axis (S2) which passes through the transverse side faces, the insert's convex-curved transversal side faces (130, 140) are tangential to the opposite short sides of the minimum bounding rectangle (180).

16. The cutting insert according to claim 15, wherein:
at least 50% of the length of the substantially parallel, flat longitudinal side faces (110, 120) is recessed relative to the corresponding long sides of the imaginary minimum bounding rectangle (180).

17. The cutting insert according to claim 16, wherein:
each chip discharge groove (153, 154) begins proximate an associated corner cutting edge (150-1, 150-2, 160-3, 160-4) which protrudes from an associated upper or lower face, extends along a corresponding transversal side face (130, 140), and terminates at a chip exit portion (150-4, 150-3, 160-2) provided at an adjacent corner which is recessed from said associated upper or lower face.

18. The cutting insert according to claim 17, wherein:
the upper face (150) and the lower face (150) are substantially rotationally symmetric with respect to the longitudinal axis (S2);
the upper face (150) and the lower face (160) are substantially rotationally symmetric with respect to the transversal axis (S1); and
the upper face (150) and the lower face (160) are each substantially 180-degree rotationally symmetric with respect to a vertical axis (A) of the through hole (190).

19. The cutting insert according to claim 15, wherein:
each chip discharge groove (153, 154) begins proximate an associated corner cutting edge (150-1, 150-2, 160-3, 160-4) which protrudes from an associated upper or lower face, extends along a corresponding transversal side face (130, 140), and terminates at a chip exit portion (150-4, 150-3, 160-2) provided at an adjacent corner which is recessed from said associated upper or lower face.

20. The cutting insert according to claim 19, wherein:
the upper face (150) and the lower face (150) are substantially rotationally symmetric with respect to the longitudinal axis (S2);
the upper face (150) and the lower face (160) are substantially rotationally symmetric with respect to the transversal axis (S1); and
the upper face (150) and the lower face (160) are each substantially 180-degree rotationally symmetric with respect to a vertical axis (A) of the through hole (190).

* * * * *